Patented Jan. 3, 1928.

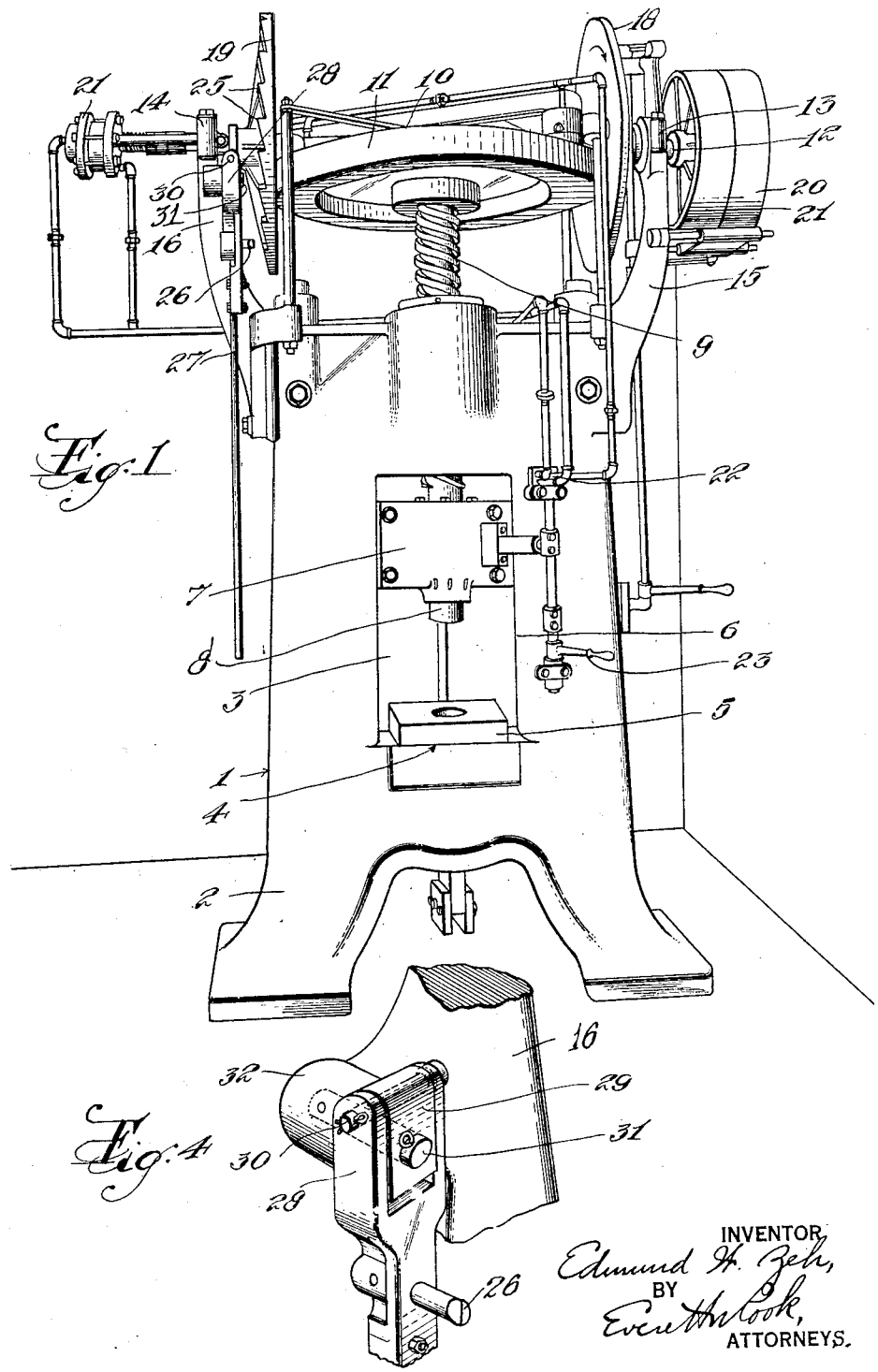

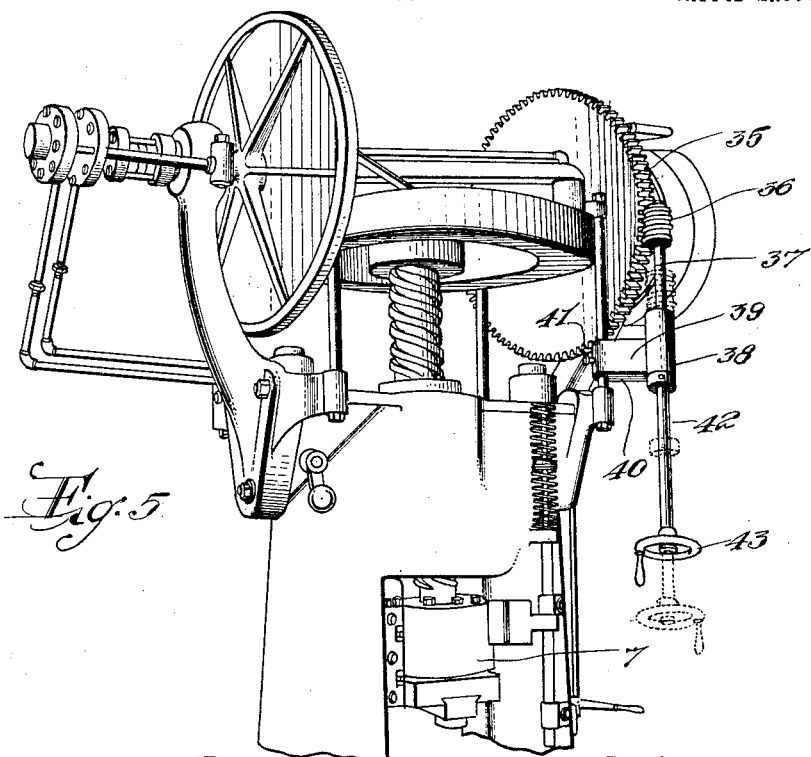
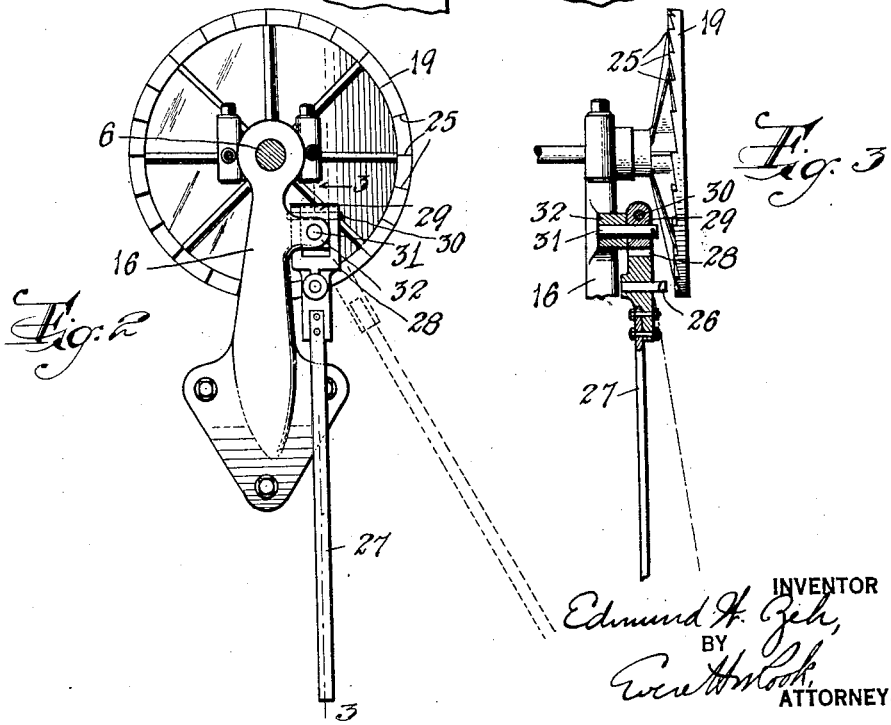

1,655,120

UNITED STATES PATENT OFFICE.

EDMUND W. ZEH, OF NEWARK, NEW JERSEY.

ADJUSTING APPARATUS FOR POWER PRESSES.

Application filed December 9, 1926. Serial No. 153,595.

This invention relates in general to that class of power presses in which a head for carrying one die is moved toward and away from a bed supporting a fixed die by a screw which is alternately rotated in opposite directions by alternate engagement of a pair of friction disks with opposite sides of a friction wheel carried by the screw, the invention being more particularly directed to large presses of this type in which the friction wheel is beyond the reach of the operator for manual rotation to operate the head for adjustment of the dies relative to each other.

As is known to those skilled in the operation of such presses, when changing dies or when relative adjustment of the upper and lower dies is necessary, the head carrying the upper die must be lowered and raised slowly, requiring manual operation which in small presses is possible by the operator reaching up and slowly turning the friction wheel by hand. With large presses of great power the friction wheel is out of normal reach of the operator and it is accordingly necessary for one man to climb to convenient relation to the friction wheel as by a ladder or scaffold and rotate the wheel while another man adjusts the dies and directs operation of the friction wheel. Obviously, this last-mentioned procedure is slow and expensive and also inconvenient in the usual limited space of a factory.

One object of this invention is to provide apparatus whereby the friction wheel of such large presses may be manually operated from the floor for the purpose of adjusting dies, etc. so that one operator may both raise and lower the head of the press and make necessary adjustments of the dies.

Another object is to provide novel and improved means for rotating the driving friction disks manually operable from the floor and whereby the head of the press may be raised and lowered by the same means and at the desired moment and speed.

Other objects are to provide apparatus of the character described which will in no manner interfere with or impede normal power operation of the press and which cannot become damaged by inadvertent starting of the press by power; to provide such apparatus comprising a novel and improved construction and combination of a ratchet or a worm gear on one of said friction disks and a pawl or a worm respectively mounted on the frame of the press for manual operation to cooperate with the respective ratchet or worm gear for rotating said disks to drive said friction wheel; to provide such apparatus which is simple and inexpensive in construction and operation, and to obtain other results and advantages as may be brought out by the following description.

Referring to the accompanying drawings, in which corresponding and like parts are designated throughout the several views by the same reference characters, Figure 1 is a front elevation of a power press having apparatus embodying my invention applied thereto;

Figure 2 is a fragmentary elevation of the left-hand side of the upper portion of the press as viewed from Fig. 1, portions thereof being omitted;

Figure 3 is a vertical sectional view, taken on the line 3—3 of Fig. 2, portions being shown in side elevation;

Figure 4 is an enlarged fragmentary perspective view of the pawl and its mounting as shown in Figures 1–3, inclusive, and Figure 5 is a view similar to Fig. 1 showing a modified form of the invention.

The invention is specifically described in connection with a power press of several hundred tons capacity illustrated by Figures 1 to 4, inclusive, wherein the numeral 1 designates the frame of the press which is mounted on legs 2 in a vertical position. The frame 1 is provided with an elongated vertically disposed opening 3 extending transversely through the frame at its longitudinal center, said opening being formed at the lower end thereof with a bed 4 at a convenient height for the operator, adapted to receive a fixed die 5. The sides of the opening 3 are provided with vertical guides 6 upon and between which is mounted a vertically slidable head 7 adapted to carry another die 8 to cooperate with the fixed die. This head 7 is carried by the lower end of a vertical screw 9 which has a suitable swivel connection with the head and extends upwardly through the top of the frame 1, the upper end thereof being provided with a horizontally disposed wheel 10 having a friction surface 11 on its periphery. It is obvious, therefore, that rotation of the screw alternately in opposite directions will cause the head 7 to be moved up and down on the guides 6.

Arranged above the friction wheel 10 and diametrically thereof is a horizontally disposed drive shaft 12 journaled in bearings 13 and 14 at the upper ends of upstanding brackets 15 and 16 secured to opposite sides of the frame 1. The bearings 13 and 14 are preferably anti-friction, and the shaft 12 is both rotatable and slidable therein. Fixed on the shaft 12 at diametrically opposite sides of the friction wheel 10 is a pair of friction disks 18 and 19 adapted to alternately engaged the friction surface 11 of the wheel 10 to rotate the screw 9. One end of the shaft 12 is provided with fast and loose pulleys 20 and 21 respectively, which are adapted to receive a drive belt (not shown) to rotate the shaft 12. Assuming the shaft 12 to be rotating in the direction of the arrows on Figures 1 and 2, it will be obvious that as the friction disk 18 engages the wheel 10 the head 7 will be forced downwardly, while engagement of the disk 19 with the wheel 10 will move the head 8 upwardly. To accomplish the alternate engagement of the friction disks 18 and 19 with the friction wheel 10 the shaft 12 is slidable in its bearings, and is preferably actuated by a fluid pressure motor 21 controlled by a valve 22 operated by a hand lever 23, or by other suitable means.

In such large presses as illustrated the friction wheel 10 is at an elevation considerably beyond the reach of the operator so that he cannot rotate said wheel directly by hand when standing on the floor adjacent the press in working relation to the bed 4 in order to adjust the dies.

This difficulty is overcome by the invention one preferred embodiment of which is illustrated in Figures 1 to 4, inclusive, of the drawings, wherein one of the friction disks, in the present instance the disk 19, is provided on its outer side with an annular concentric series of ratchet teeth 25 with which is adapted to cooperate a pawl 26 mounted on an operating lever 27 which is pivoted on the frame of the press to swing in planes both parallel to the plane of the friction disk and at right angles thereto, the actuating lever depending into a convenient position for the operator so that by oscillation of the lever successively in planes at right angles to the friction disk and parallel thereto, the friction disk may be rotated with a step by step motion.

The operating lever 27 has the upper end thereof bifurcated as at 28 and a block 29 pivotally mounted between the arms of the bifurcation upon a pivot pin 30. The block 29 is in turn pivotally mounted upon a pivot stud 31 the axis of which is at right angles to the axis of the pivot pin 30, said pivot stud 31 being fixedly mounted in a lug 32 secured to the bracket 16 in any suitable manner as by being cast integrally therewith. The pivot stud 31 is disposed substantially parallel to the axis of the friction disk 19, while the axis of the pivot pin 30 is disposed at substantially right angles to the axis of said friction disk. Therefore, the lever 27 may swing toward and from the friction disk upon the pivot pin 30, and in a plane parallel to the friction disk about the stud 31.

Obviously, the pawl 26 is spaced such a distance from the stud 31 as to properly engage the ratchet teeth 25 on the friction disk, and the suspension of the lever 27 upon the pin 30 is such as to normally maintain the pawl 26 out of engagement with the ratchet teeth 25 by action of gravity. Preferably the lever 27 is so mounted upon the frame of the press and in connection with the particular friction disk 19 as to permit the operator to actuate the friction disks with a pushing force which is easier and more convenient than pulling against the resistance of the friction wheels, friction disk and head 7.

The operation of the apparatus is probably understood from the foregoing. When it is desired to lower or raise the head 7 of the press slowly and under manual control for the purpose of adjusting the dies 5 and 8 relatively to each other or for any other reason, the motor 21 or any other means which may be utilized is actuated to slide the shaft 12 in the proper direction and cause engagement of the proper friction disk with the wheel 10, it being understood that engagement of one disk with the wheel will cause lowering of the head, while engagement of the other disk of the wheel will cause rising of the head. The lever 27 is then swung about the pivot pin 30 inwardly toward the friction disk 19 to cause the pawl 26 to engage one of the teeth 25, whereupon the lever is pushed away from the operator or in a clockwise direction so that the friction disks are rotated in the direction indicated by the arrow on Figures 1 and 2 of the drawings. This oscillation of the lever is continued to cause engagement of the pawl 26 successively with the teeth of the disk until the head has been moved the desired distance.

It will be observed that as soon as the operator releases the lever 27 it immediately assumes a normal out-of-the-way position with respect to the friction disk 19, and furthermore the friction disk 19 normally rotates under power in the same direction which is caused by actuation of the lever 27 and pawl 26; and therefore it is impossible for the operator or the lever or pawl to become injured by sudden or unintentional application of power to the press.

With the invention, the operator standing upon the floor in convenient relation to the bed 4 for adjusting the dies 5 and 8 relatively to each other, may himself actuate the head 7 as may be necessary.

Another form of adjusting apparatus for accomplishing the same result as that above described is illustrated in Figure 5 of the drawing. In this form of the invention one of the friction disks is provided upon its periphery with a worm gear 35 with which is adapted to cooperate a worm 36 mounted on a shaft 37 slidable in a bearing 38 carried by a bracket 39 mounted upon a convenient part of the press frame, for instance a vertical rod 40. The shaft 37 is substantially vertical and disposed in an approximate tangential relation to the friction disk so as to cause proper meshing of the worm 36 with the gear 35. This relation may be adjusted by swinging of the bracket 39 about the rod 40, a set screw 41 serving to hold the bracket in adjusted position. The shaft is slidable in the bearing 38 so that the worm 36 may be moved out of engagement with the gear 35 as shown by dotted lines or into engagement with the gear as shown in solid lines. The limits of the movement of the shaft in opposite directions may be determined by the worm itself and a collar 42 secured on the shaft, the worm and collar engaging the bracket 39 at opposite ends. The shaft 37 is of such a length as to extend downwardly into convenient position relative to the operator and has upon its lower end an operating wheel 43 for actuating the shaft.

The normal or inoperative position of the worm 36 is shown in dotted lines. When it is desired to actuate the head 7 of the press by hand, the shaft 37 is pushed upwardly to cause meshing of the worm 36 with the gear 35, this movement being limited by the collar 42. The wheel 43 is then rotated which causes slow rotation of the friction disk, and obviously this operation may be accomplished by the operator standing upon the floor and while he is adjusting the dies.

Should power be suddenly or inadvertently applied to the press, the gear 35 will force the worm 36 out of engagement and slide the shaft 37 downwardly, and accordingly there is no likelihood of the apparatus or the operator becoming injured by application of power to the press while the worm 36 is in operative relation to the gear 35.

While I have shown and described two preferred embodiments of my invention, it will be understood that this is primarily for the purpose of illustrating the principles of the invention, and that the invention may be embodied in other details of construction than those illustrated and described without departing from the spirit or scope of the invention. Therefore, I do not desire to be understood as limiting myself, except as required by the following claims when construed in the light of the prior art.

Having thus described the invention, what I claim is:

1. The combination with a power press including a frame, a head movable therein, means for moving said head, and a rotatable and slidable drive shaft adapted to alternately connect with and disconnect from said head-moving means as said shaft is slid, of means for manually rotating said shaft comprising a member fast on said shaft, a manually movable member mounted on a stationary support to cooperatively separably engage said member on the shaft to rotate said shaft, and a handle both for cooperatively engaging members and for actuating said movable member to rotate said shaft.

2. In a press, the combination with a frame, a screw mounted in said frame, a head on one end of said screw adapted to slide in said frame, a friction wheel on the other end of said screw, drive disks to engage said friction wheel at diametrically opposite points on its edge, a slidable shaft for said drive disks, and means for sliding said shaft selectively in opposite directions to engage said disks with said wheel, of means for rotating said shaft comprising a pair of cooperating driving members one mounted on one of said disks and the other on a stationary support, and means for actuating the second-mentioned member.

3. In a press, the combination with a frame, a screw mounted in said frame, a head on one end of said screw adapted to slide in said frame, a friction wheel on the other end of said screw, drive disks to engage said friction wheel at diametrically opposite points on its edge, a slidable shaft for said drive disks, power means for rotating said shaft in one direction, and means for sliding said shaft selectively in opposite directions to engage said friction disks selectively with said wheel, of a pair of cooperating driving members one mounted on one of said disks and the other on a stationary support to rotate said shaft in the same direction as does said power means, said driving members having an operative connection freely and automatically separable upon rotation of said shaft by said power means.

4. In a press, the combination with a frame, a screw mounted in said frame, a head on one end of said screw adapted to slide in said frame, a friction wheel on the other end of said screw, drive disks to engage said frictional wheel at diametrically opposite points on its edge, a slidable shaft for said drive disks, power means for rotating said shaft in one direction, and means for sliding said shaft selectively in opposite directions to engage said friction disks selectively with said wheel, of a pair of cooperating driving members one mounted on one of said disks and the other on a stationary support to rotate said shaft in the same direction as does said power means, said driving members having an operative connection freely and automatically separable upon rotation of said shaft by said power means, and a handle both for cooperatively engaging said driving members and for actuating the second-mentioned driving member.

5. In a press, the combination with a frame, a screw mounted in said frame, a head on one end of said screw adapted to slide in said frame, a friction wheel on the other end of said screw, drive disks to engage said friction wheel at diametrically opposite points on its edge, a slidable shaft for said drive disks, power means for rotating said shaft in one direction, and means for sliding said shaft selectively in opposite directions to engage said friction disks selectively with said wheel, of a ratchet upon one of said disks, a pawl to cooperate with said ratchet to rotate said shaft, and an operating lever for said pawl pivotally mounted on a stationary support to normally by action of gravity hold said pawl out of engagement with said ratchet and both to move said pawl into engagement with said ratchet and to rotate said ratchet.

6. In a press, the combination with a frame, a screw mounted in said frame, a head on one end of said screw adapted to slide in said frame, a friction wheel on the other end of said screw, drive disks to engage said friction wheel at diametrically opposite points on its edge, a slidable shaft for said drive disks, power means for rotating said shaft in one direction, and means for sliding said shaft selectively in opposite directions to engage said friction disks selectively with said wheel, of a ratchet upon one side of one of said disks, a pawl to cooperate with said ratchet to rotate said shaft, and an operating lever for said pawl pivotally mounted on a stationary support to swing in a plane at right angles to the plane of said ratchet to engage said ratchet and to swing in a plane parallel to the plane of said ratchet to rotate said disk, said pivotal mounting of said lever holding said pawl normally out of engagement with said ratchet by action of gravity.

7. In a press, the combination with a frame, a screw mounted in said frame, a head on one end of said screw adapted to slide in said frame, a friction wheel on the other end of said screw, drive disks to engage said friction wheel at diametrically opposite points on its edge, a slidable shaft for said drive disks, power means for rotating said shaft in one direction, and means for sliding said shaft selectively in opposite directions to engage said friction disks selectively with said wheel, of a ratchet upon one side of one of said disks, a pawl to cooperate with said ratchet to rotate said shaft, an operating lever carrying said pawl, a block pivotally mounted on a stationary support to swing about an axis parallel to the axis of said disk, and means pivotally mounting said lever on said block on an axis at right angles to the axis of said disk, said pivotal mountings normally holding said pawl out of engagement with said ratchet by action of gravity.

8. The combination with a power press including a frame, a head movable therein, means for moving said head, a rotatable and slidable drive shaft adapted to alternately connect with and disconnect from said head-moving means as said shaft is slid, and power means for rotating said shaft in one direction, of remotely actuated manually operable driving means for rotating said shaft independently of said power means.

9. The combination with a power press including a frame, a head movable therein, means for moving said head, a rotatable and slidable drive shaft adapted to alternately connect with and disconnect from said head-moving means as said shaft is slid, and power means for rotating said shaft in one direction, of cooperating driving members on said shaft and a stationary support to rotate said shaft in the same direction as said power means, said driving members having an operative driving connection freely and automatically separable upon rotation of said shaft by said power means, and a handle for manually actuating said driving members.

EDMUND W. ZEH.